United States Patent [19]
Haselden

[11] Patent Number: 5,931,121
[45] Date of Patent: Aug. 3, 1999

[54] EASY-MAINTENANCE KENNEL WATER PAN

[76] Inventor: Freddie W. Haselden, 1121 Possum Fork Rd., Johnsonville, S.C. 29555

[21] Appl. No.: 08/992,567

[22] Filed: Dec. 17, 1997

[51] Int. Cl.$^6$ ...................................................... A01K 5/01
[52] U.S. Cl. .............................. 119/515; 119/454; 119/61
[58] Field of Search .................................. 119/51.01, 61, 119/72, 454, 464, 475, 515

[56] References Cited

U.S. PATENT DOCUMENTS

| | | | |
|---|---|---|---|
| 1,719,769 | 7/1929 | Kaufman | 119/515 |
| 3,554,165 | 1/1971 | Carter | 119/61 |
| 5,224,443 | 7/1993 | Leslie | 119/515 |
| 5,297,504 | 3/1994 | Carrico | 119/72 |
| 5,421,290 | 6/1995 | Welch | 119/61 |
| 5,499,609 | 3/1996 | Evans et al. | 119/61 |
| 5,564,362 | 10/1996 | Fiveash | 119/61 |

*Primary Examiner*—Michael J. Carone
*Assistant Examiner*—Elizabeth Shaw

[57] ABSTRACT

A water dish cleaning system including a dish and a least one rigid pivot rod connected between the dish and one of the side walls of a cage thereby allowing the pivot rod and dish to pivot about a horizontally oriented axis. Further provided is a lifting rod for effecting the pivoting of the dish about the horizontally oriented axis.

8 Claims, 2 Drawing Sheets

# EASY-MAINTENANCE KENNEL WATER PAN

BACKGROUND OF THE INVENTION

1. Field of the Invention

The present invention relates to pet dishes and more particularly pertains to a new easy-maintenance kennel water pan for conveniently emptying, cleaning and refilling a pet dish within a cage with food or water.

2. Description of the Prior Art

The use of pet dishes is known in the prior art. More specifically, pet dishes heretofore devised and utilized are known to consist basically of familiar, expected and obvious structural configurations, notwithstanding the myriad of designs encompassed by the crowded prior art which have been developed for the fulfillment of countless objectives and requirements.

Known prior art pet dishes include U.S. Pat. No. 4,798, 170; U.S. Pat. No. 4,084,779; U.S. Pat. No. 4,622,776; U.S. Pat. No. 4,869,385; U.S. Pat. No. 4,385,742; and U.S. Pat. Des. 340,554.

In these respects, the easy-maintenance kennel water pan according to the present invention substantially departs from the conventional concepts and designs of the prior art, and in so doing provides an apparatus primarily developed for the purpose of conveniently emptying, cleaning and refilling a pet dish within a cage with food or water.

SUMMARY OF THE INVENTION

In view of the foregoing disadvantages inherent in the known types of pet dishes now present in the prior art, the present invention provides a new easy-maintenance kennel water pan construction wherein the same can be utilized for conveniently emptying, cleaning and refilling a pet dish within a cage with food or water.

The general purpose of the present invention, which will be described subsequently in greater detail, is to provide a new easy-maintenance kennel water pan apparatus and method which has many of the advantages of the pet dishes mentioned heretofore and many novel features that result in a new easy-maintenance kennel water pan which is not anticipated, rendered obvious, suggested, or even implied by any of the prior art pet dishes, either alone or in any combination thereof.

To attain this, the present invention generally comprises a wire cage mounted on a recipient surface. The wire cage has a plurality of side walls each formed of wire mesh. Such wire mesh is defined by a plurality of intersecting horizontally and vertically oriented rigid wires. Also included is a dish having a circular bottom face and a frusto-conical periphery. The periphery thus defines a circular open top with an upper peripheral edge associated therewith. Three apertures are formed in the upper peripheral edge of the disk at equally spaced locations. A pair of rigid linear pivot rods are included each having a first predetermined length and a loop formed on each of the ends thereof. The loops of first ends of the pivot rods are spacedly and pivotally coupled about a common horizontally oriented wire of the cage. Such wire resides at a height common to the upper peripheral edge of the dish. On the other hand, the loops of second ends of the pivot rods are each fixedly coupled to associated separated apertures of the dish. During use, the pivot rods remain in parallel relationship and define a plane which always contains the upper peripheral edge of the dish. As such, the pivot rods and dish are adapted to pivot about the horizontally oriented wire of the cage to which the pivot rods are coupled. Finally, a rigid linear lift rod is provided having a second predetermined length which is greater than the first predetermined length. The lift rod has a pair of ends of which at least one has a loop formed thereon, similar to the pivot rods. The loop of the lift rod is pivotally coupled to a remaining one of the apertures of the dish. As shown in FIG. 1, the lift rod is angled upwardly and rests in sliding relationship on a horizontal wire above that coupled to the pivot rods. The lift rod may be pulled so as to effect the lifting of the dish between a lowered orientation with the bottom face of the dish resting on the recipient surface and a raised orientation with the open top abutting one of the side walls of the cage.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new easy-maintenance kennel water pan apparatus and method which has many of the advantages of the pet dishes mentioned heretofore and many novel features that result in a new easy-maintenance kennel water pan which is not anticipated, rendered obvious, suggested, or even implied by any of the prior art pet dishes, either alone or in any combination thereof.

It is another object of the present invention to provide a new easy-maintenance kennel water pan which may be easily and efficiently manufactured and marketed.

It is a further object of the present invention to provide a new easy-maintenance kennel water pan which is of a durable and reliable construction.

An even further object of the present invention is to provide a new easy-maintenance kennel water pan which is susceptible of a low cost of manufacture with regard to both materials and labor, and which accordingly is then susceptible of low prices of sale to the consuming public, thereby making such easy-maintenance kennel water pan economically available to the buying public.

Still yet another object of the present invention is to provide a new easy-maintenance kennel water pan which provides in the apparatuses and methods of the prior art some of the advantages thereof, while simultaneously overcoming some of the disadvantages normally associated therewith.

Still another object of the present invention is to provide a new easy-maintenance kennel water pan for conveniently emptying, cleaning and refilling a pet dish within a cage with food or water.

Even still another object of the present invention is to provide a new easy-maintenance kennel water pan that includes a dish and a least one rigid pivot rod connected between the dish and one of the side walls of a cage thereby allowing the pivot rod and dish to pivot about a horizontally oriented axis. Further provided is a lifting rod for effecting the pivoting of the dish about the horizontally oriented axis.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
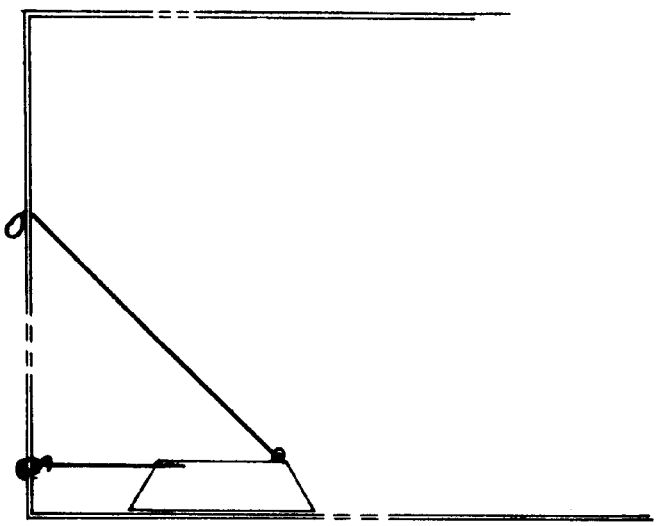
FIG. 1 is a side view of the dish of the present invention in the lowered orientation.
Figure 2:
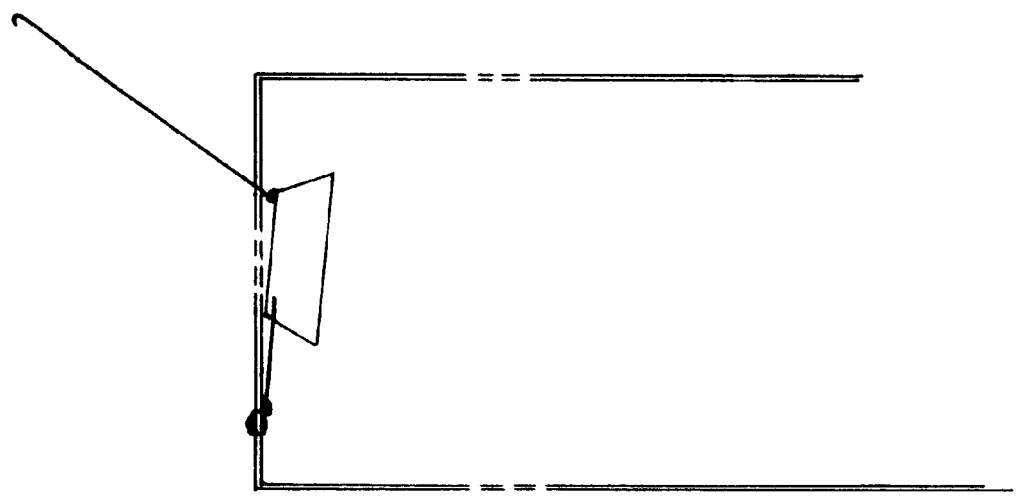
FIG. 2 is a side view of the dish of the present invention in the raised orientation.
Figure 3:
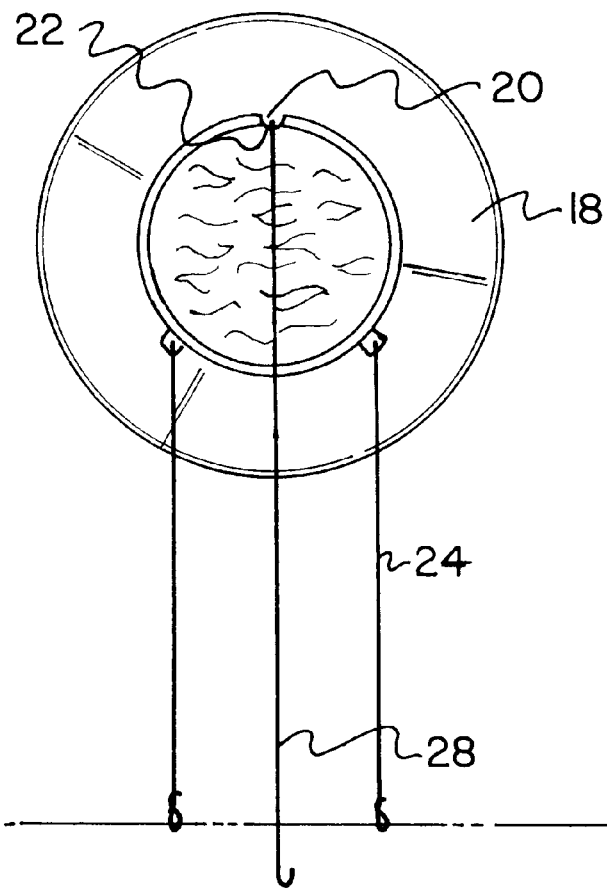
FIG. 3 is a top view of the present invention.

With reference now to the drawings, and in particular to FIGS. 1 through 4 thereof, a new easy-maintenance kennel water pan embodying the principles and concepts of the present invention and generally designated by the reference numeral 10 will be described.

The present invention, as designated as numeral 10, includes a wire cage 12 mounted on a recipient surface. The wire cage has a plurality of vertical side walls 14 each formed of wire mesh. Such wire mesh is defined by a plurality of intersecting horizontally and vertically oriented rigid wires 16.

Also included is a dish 18 having a circular bottom face and a frusto-conical periphery. The periphery thus defines a circular open top with an upper peripheral edge associated therewith. Three apertures 20 are formed in the upper peripheral edge of the disk at equally spaced locations. Such apertures may be formed in radially extending tabs 22 which are in turn integrally coupled to the dish.

Figure 4:
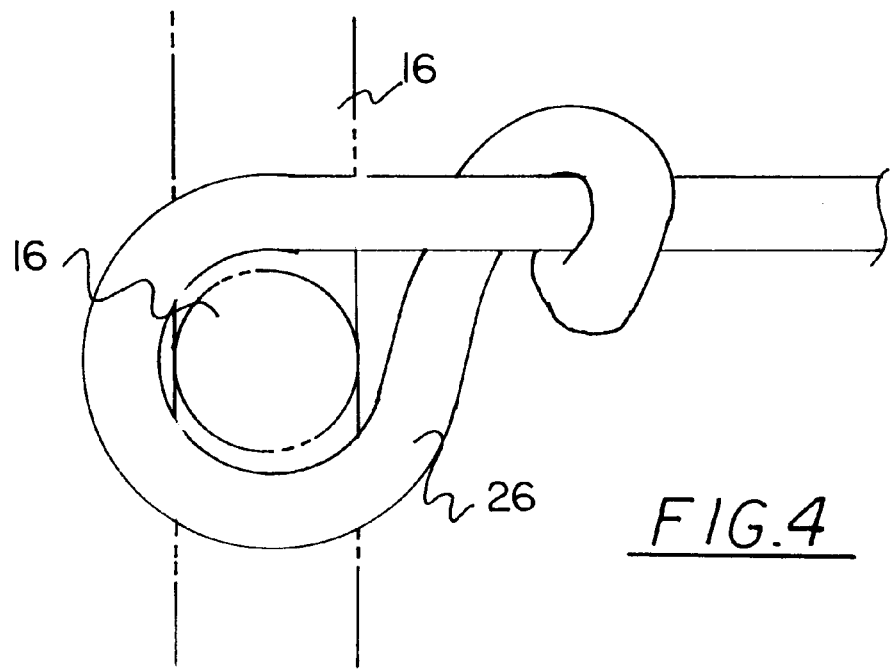
FIG. 4 is a close-up view of one of the loops of the present invention.

A pair of rigid linear pivot rods 24 are included each having a first predetermined length and a loop 26 formed on each of the ends thereof. It should be noted that the rods of the present invention may very well refer to a heavy gauge wire or the like. In the preferred embodiment, the loop includes an end of the rod bent to form a closed-loop configuration and further twisted with itself for strength, as shown in FIG. 4.

The loops of first ends of the pivot rods are spacedly and pivotally coupled about a common horizontally oriented wire of the cage. Such wire resides at a height common to the upper peripheral edge of the dish. On the other hand, the loops of second ends of the pivot rods are each fixedly coupled to associated separated apertures of the dish. The second ends may be fixedly coupled to the dish via glue, a flange or any other suitable means.

During use, the pivot rods remain in parallel relationship and define a plane which always contains the entire upper peripheral edge of the dish. As such, the pivot rods and dish are adapted to pivot about the horizontally oriented wire of the cage to which the pivot rods are coupled.

Finally, a rigid linear lift rod 28 is provided having a second predetermined length which is greater than the first predetermined length. The lift rod has a pair of ends one of which has a loop formed thereon, similar to the pivot rods. The loop of the lift rod is pivotally coupled to a remaining one of the apertures of the dish. As shown in FIG. 1, the lift rod is angled upwardly and rests in sliding relationship on a horizontal wire above that coupled to the pivot rods. The lift rod may be pulled so as to effect the lifting of the dish between a lowered orientation with the bottom face of the dish resting on the recipient surface and a raised orientation with the open top abutting one of the side walls of the cage for emptying, cleaning, and refilling if necessary.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A water dish cleaning system, comprising:

a wire cage mounted on a recipient surface, the wire cage having a plurality of side walls each formed of wire mesh defined by a plurality of intersecting horizontally and vertically oriented rigid wires;

a dish having a circular bottom face and a frusto-conical periphery defining a circular open top with an upper peripheral edge associated therewith;

three apertures formed in the upper peripheral edge of the disk at equally spaced locations;

a pair of rigid linear pivot rods each having a first predetermined length and a loop formed on each of the ends thereof, wherein the loops of the first ends of the pivot rods are spacedly and pivotally coupled about a common horizontally oriented wire of the cage which resides at a height common to the upper peripheral edge of the dish and the loops of second ends of the pivot rods are each fixedly coupled to associated separated apertures of the dish, wherein the pivot rods remain in parallel relationship and define a plane which always contains the upper peripheral edge of the dish, thereby allowing the pivot rods and dish to pivot about the horizontally oriented wire of the cage to which the pivot rods are coupled; and a rigid linear lift rod having a second predetermined length which is greater than the first predetermined length, the lift rod having a pair of ends each with a loop formed thereon, wherein the loop of the lift rod is pivotally coupled to a remaining one of the apertures of the dish with the lift rod angled upwardly and resting in sliding relationship on a horizontal wire above that coupled to the pivot rods, the lift rod adapted to be pulled so as to effect the lifting of the dish between a lowered orientation with the bottom face of the dish resting on the recipient surface and a raised orientation with the open top abutting one of the side walls of the cage.

2. A water dish cleaning system for use with a wire cage mounted on a recipient surface, the wire cage having at least one side wall formed of wire mesh, the dish cleaning system comprising:

a dish;

a least one rigid pivot rod connected between the dish and one of the side walls of the cage thereby allowing the pivot rod and dish to pivot about a horizontally oriented axis; and lifting means for effecting the pivoting of the dish about the horizontally oriented axis.

3. A water dish cleaning system as set forth in claim 2 wherein the dish has a frusto-conical configuration.

4. A water dish cleaning system as set forth in claim 2 wherein the lifting means includes a rigid lift rod connected to the dish and extending from the cage.

5. A water dish cleaning system as set forth in claim 4 wherein the lift rod is pivotally connected to a side of the dish opposite the pivot rod.

6. A water dish cleaning system as set forth in claim 4 wherein the lift rod is longer than the pivot rod.

7. A water dish cleaning system as set forth in claim 2 wherein the pivot rod is fixedly coupled to the dish and pivotally coupled to the cage.

8. A water dish cleaning system as set forth in claim 2 wherein the lifting means is adapted to effect the lifting of the dish between a lowered orientation with a bottom face of the dish resting on the recipient surface and a raised orientation with an open top of the dish abutting one of the side walls of the cage.

* * * * *